US012646837B2

(12) United States Patent
Hou et al.

(10) Patent No.: US 12,646,837 B2
(45) Date of Patent: Jun. 2, 2026

(54) ELECTRONIC DEVICE

(71) Applicant: VIVO MOBILE COMMUNICATION CO., LTD., Guangdong (CN)

(72) Inventors: Zipeng Hou, Guangdong (CN); Zhengping Hu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 153 days.

(21) Appl. No.: 18/647,937

(22) Filed: Apr. 26, 2024

(65) Prior Publication Data

US 2024/0275046 A1 Aug. 15, 2024

Related U.S. Application Data

(63) Continuation of application No. PCT/CN2022/128378, filed on Oct. 28, 2022.

(30) Foreign Application Priority Data

Oct. 28, 2021 (CN) ......................... 202111267203.3

(51) Int. Cl.
*H01Q 5/10* (2015.01)
*H01Q 5/328* (2015.01)
(Continued)

(52) U.S. Cl.
CPC ................. *H01Q 5/10* (2015.01); *H01Q 5/35* (2015.01); *H01Q 1/241* (2013.01); *H01Q 1/36* (2013.01)

(58) Field of Classification Search
CPC .......... H01Q 1/24; H01Q 1/241; H01Q 1/243; H01Q 1/273; H01Q 1/52; H01Q 5/10;
(Continued)

(56) References Cited

U.S. PATENT DOCUMENTS

2017/0054196 A1* 2/2017 Hu ......................... H01Q 1/243
2017/0162933 A1 6/2017 Xiong et al.
(Continued)

FOREIGN PATENT DOCUMENTS

CN 106848567 A 6/2017
CN 110336897 A 10/2019
(Continued)

OTHER PUBLICATIONS

Extended European Search Report for Application No. 22886143.1, dated Feb. 5, 2025, 9 Pages.
(Continued)

*Primary Examiner* — Thai Pham
(74) *Attorney, Agent, or Firm* — BROOKS KUSHMAN P.C.

(57) ABSTRACT

An electronic device, and the electronic device includes: a frame body, a display, and an antenna coupling structure. The display is disposed on the frame body, and a display control line is disposed on a side, close to the frame body, of the display. An antenna resonant arm is disposed on the frame body, and the antenna resonant arm includes a first antenna and a second antenna. Operating frequency bands of the first antenna and the second antenna are different, and a gap is formed between the antenna resonant arm and the display control line. A clearance area is provided at a position, close to the gap, on the frame body, the antenna coupling structure is disposed in the clearance area, and the antenna coupling structure is coupled to an antenna reference ground on the frame body.

11 Claims, 2 Drawing Sheets

(51) Int. Cl.
*H01Q 5/35* (2015.01)
*H01Q 1/24* (2006.01)
*H01Q 1/36* (2006.01)

(58) Field of Classification Search
CPC .. H01Q 5/20; H01Q 5/30; H01Q 5/35; H01Q 5/328; H01Q 5/371
See application file for complete search history.

(56) References Cited

U.S. PATENT DOCUMENTS

| | | | | |
|---|---|---|---|---|
| 2019/0393586 | A1* | 12/2019 | Ayala Vazquez ...... | H01Q 5/328 |
| 2021/0075090 | A1* | 3/2021 | Yarga ..................... | H01Q 1/241 |
| 2021/0175625 | A1* | 6/2021 | Guo ....................... | H01Q 5/335 |

FOREIGN PATENT DOCUMENTS

| | | | |
|---|---|---|---|
| CN | 113871862 | A | 12/2021 |
| EP | 2284948 | A1 | 2/2011 |
| EP | 3179554 | A1 | 6/2017 |

OTHER PUBLICATIONS

International Search Report and Written Opinion for Application No. PCT /CN2022/128378, dated Jan. 18, 2023, 13 Pages.

* cited by examiner

ELECTRONIC DEVICE

CROSS-REFERENCE TO RELATED APPLICATIONS

This application is a continuation of Application No. PCT/CN2022/128378 filed on Oct. 28, 2022, which claims priority to Chinese Patent Application No. 202111267203.3 filed on Oct. 28, 2021, disclosures of which are incorporated herein by reference in their entireties.

TECHNICAL FIELD

This application pertains to the field of communication technologies, and specifically relates to an electronic device.

BACKGROUND

With the development of communication technologies, performance of electronic devices such as mobile phones and tablet computers has been continuously improved. Correspondingly, there have been a growing quantity of operating frequency bands of antennas in electronic devices and a growing quantity of antennas. To reduce space occupied by an antenna in an electronic device, integrated design has been increasingly used in antennas. For example, integrated design can be used in a near field communication (NFC) antenna and a radio frequency antenna.

In a related technology, a near field communication antenna and a radio frequency antenna can be integrally designed to be a structure of antenna resonant arm, a gap can be provided between the antenna resonant arm and a display control line beneath a display, and the gap can be used for passage of magnetic lines, to implement near field communication induction.

However, the gap between the antenna resonant arm and the display control line is narrowing due to increasingly high requirements for full-screen appearance design. As a result, an area for passage of the magnetic lines is becoming smaller, causing an insufficient induction area for a near field communication module.

SUMMARY

Embodiments of this application provide an electronic device, and the electronic device includes: a frame body, a display, and an antenna coupling structure.

The display is disposed on the frame body, and a display control line is disposed on a side, close to the frame body, of the display.

An antenna resonant arm is disposed on the frame body, the antenna resonant arm includes a first antenna and a second antenna, operating frequency bands of the first antenna and the second antenna are different, and a gap is formed between the antenna resonant arm and the display control line.

A clearance area is provided at a position, close to the gap, on the frame body, the antenna coupling structure is disposed in the clearance area, and the antenna coupling structure is coupled to an antenna reference ground on the frame body.

Optionally, the antenna coupling structure includes a flexible printed circuit board and a plurality of scattered coupling portions sequentially disposed on the flexible printed circuit board, and at least one of the coupling portions is coupled to the antenna reference ground on the frame body.

Optionally, the plurality of coupling portions are electrically connected to each other through the flexible printed circuit board.

Optionally, the flexible printed circuit board is disposed in the clearance area, an orthographic projection of at least a part of the coupling portion on the frame body overlaps the frame body, and a part of the coupling portion overlapping the frame body is coupled to the antenna reference ground on the frame body.

Optionally, a first coupling capacitor is disposed on the coupling portion.

Optionally, capacitance of the first coupling capacitor is determined according to the following formula:

$$C = \xi r * S/(4 * \pi * K * d)$$

C indicates the capacitance of the first coupling capacitor, ξr indicates a dielectric constant of a medium between the frame body and the coupling portion, S indicates a coupling area of the coupling portion, K indicates an electrostatic constant, and d indicates a distance between the coupling portion and the antenna reference ground.

Optionally, each of the coupling portions may be provided with one corresponding first coupling capacitor, and capacitance values of first coupling capacitors on different coupling portions are the same.

Optionally, each of the coupling portions may be provided with one corresponding first coupling capacitor, and capacitance values of first coupling capacitors on different coupling portions are different.

Optionally, a plurality of branch structures are arranged on the flexible printed circuit board at intervals, at least one coupling portion is disposed on each branch structure, and the coupling portion is coupled to the antenna reference ground on the frame body.

Two adjacent branch structures are high-frequency coupled to each other.

Optionally, a plurality of branch structures are sequentially arranged on the flexible printed circuit board at intervals, one coupling portion is disposed on the branch structure located at an edge, and the coupling portion is coupled to the antenna reference ground on the frame body.

Electrical connection portions are further disposed on the branch structures, and the electrical connection portions are electrically connected to the antenna reference ground on the frame body.

Two adjacent branch structures are high-frequency coupled to each other.

Optionally, the flexible printed circuit board is bonded to the frame body.

Optionally, the antenna coupling structure includes a flexible printed circuit board and a plurality of scattered coupling portions sequentially disposed on the flexible printed circuit board, and the coupling portion is coupled to the frame body.

Optionally, the electronic device further includes: a radio frequency signal source and a near field communication module. One end of the antenna resonant arm is electrically connected to the near field communication module and/or the radio frequency signal source, and the other end of the antenna resonant arm is connected to the antenna reference ground.

Optionally, the first antenna includes a radio frequency antenna, and the second antenna includes a near field communication antenna.

BRIEF DESCRIPTION OF DRAWINGS

To describe technical solutions in embodiments of this application or in the prior art more clearly, the following briefly describes accompanying drawings required for describing embodiments or the prior art. Apparently, the accompanying drawings in the following descriptions show some embodiments of this application, and a person of ordinary skill in the art may still derive other drawings from these accompanying drawings without creative efforts.

Figure 1:
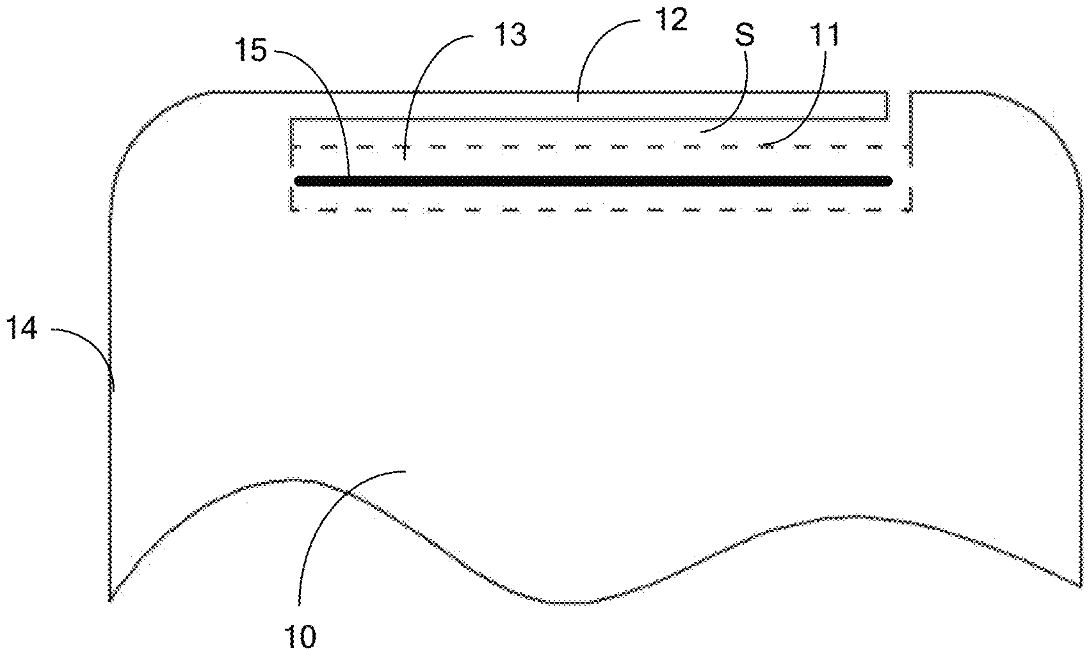
FIG. 1 is a schematic diagram of a structure of an electronic device according to an embodiment of this application.

Reference numerals: 10: frame body; 11: display control line; 12: antenna resonant arm; 13: clearance area; 14: antenna reference ground; 15: antenna coupling structure; 151: flexible printed circuit board; 152: coupling portion; 153: branch structure; 154: electrical connection portion; S: gap.

DETAILED DESCRIPTION

The following describes in detail embodiments of this application. Examples of embodiments are shown in accompanying drawings. Reference numerals which are the same or similar throughout the accompanying drawings represent identical or similar elements or elements having identical or similar functions. Embodiments described below with reference to the accompanying drawings are merely examples, and are intended to explain this application without being construed as limiting this application. All other embodiments obtained by a person of ordinary skill in the art based on embodiments of this application without creative efforts shall fall within the protection scope of this application.

In the specification and claims of this application, features of the terms "first" and "second" may explicitly or implicitly include one or more such features. In the descriptions of this application, unless otherwise specified, "a plurality of" means two or more. In addition, in this specification and the claims, "and/or" indicates at least one of connected objects, and a character "/" generally indicates an "or" relationship between associated objects.

In the descriptions of this application, it should be understood that an orientation or positional relationship indicated by the term "center", "longitudinal", "transverse", "length", "width", "thickness", "above", "beneath", "front", "back", "left", "right", "vertical", "horizontal", "top", "bottom", "internal", "external", "clockwise", "counterclockwise", "axial direction", "radial direction", "circumferential direction", or the like is based on an orientation or positional relationship shown in the accompanying drawings, and is merely for ease of describing this application and simplifying description, but does not indicate or imply that an apparatus or an element referred to must have a specific orientation or be constructed and operated in a specific orientation, and therefore cannot be understood as a limitation on this application.

In the descriptions of this application, unless otherwise specified and defined explicitly, the terms "mount", "join", and "connect" should be understood in their general senses. For example, they may refer to a fixed connection, a detachable connection, or an integral connection; may refer to a mechanical connection or an electrical connection; or may refer to a direct connection, an indirect connection through an intermediate medium, or an internal communication between two elements. For a person of ordinary skill in the art, specific meanings of the foregoing terms in this application may be understood based on a specific situation.

Embodiments of this application provide an electronic device. The electronic device includes at least one of a mobile phone, a tablet computer, and a wearable device. A specific type of the electronic device is not limited in embodiments of this application.

Figure 2:
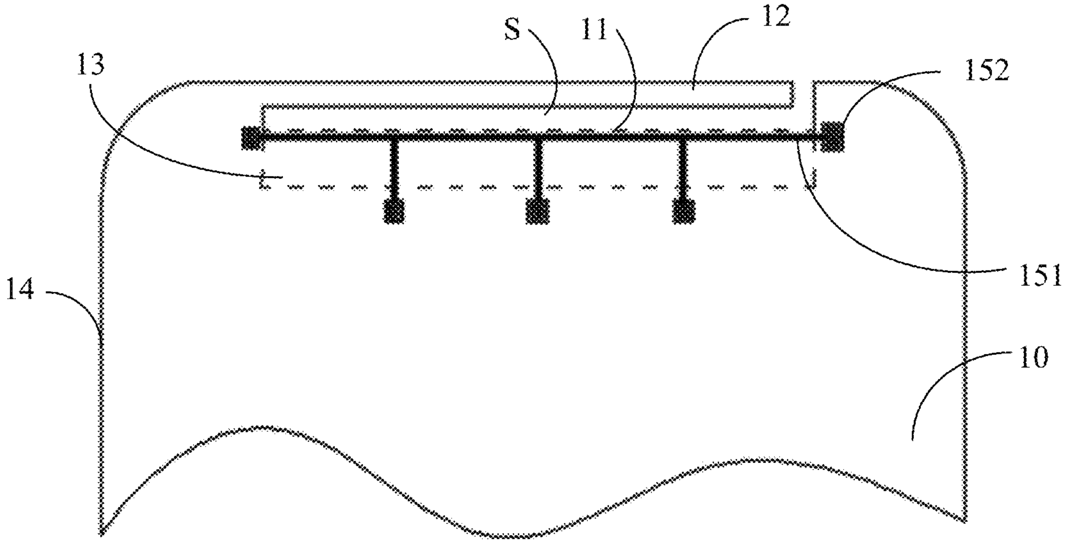
FIG. 2 is a schematic diagram of an internal structure of an electronic device according to an embodiment of this application.

FIG. 1 is a schematic diagram of a structure of an electronic device according to an embodiment of this application. FIG. 2 is a schematic diagram of an internal structure of an electronic device according to an embodiment of this application. Specifically, the electronic device may include a frame body 10, a display (not shown in the figure), and an antenna coupling structure 15. The display is disposed on the frame body 10, and a display control line 11 is disposed on a side, close to the frame body 10, of the display. An antenna resonant arm 12 is disposed on the frame body 10, the antenna resonant arm 12 may specifically include a first antenna and a second antenna, operating frequency bands of the first antenna and the second antenna are different, and a gap S is formed between the antenna resonant arm 12 and the display control line 11. A clearance area 13 is provided at a position, close to the gap S, on the frame body 10, the antenna coupling structure 15 is disposed in the clearance area 13, and the antenna coupling structure 15 is coupled to an antenna reference ground 14 on the frame body 10.

In embodiments of this application, because the clearance area 13 is provided at the position, close to the gap S, on the frame body 10, and the clearance area 13 can be used for passage of magnetic lines, an area for passage of the magnetic lines can be increased to achieve an objective of increasing an induction area for a near field communication module. In addition, because the antenna coupling structure 15 is disposed in the clearance area 13, the antenna coupling structure 15 may be coupled to the antenna reference ground 14 to form a high-frequency return current path, increase coupling paths, and prevent performance of the first antenna from being degraded. This can extend the area for passage of the magnetic lines without degrading the performance of the first antenna, and therefore increase the induction area for the near field communication module without degrading the performance of the first antenna in a case that the first antenna and the second antenna are integrally disposed.

Specifically, the frame body 10 may be used as a structural main body of the electronic device, and configured to support the display, a motherboard, a back cover, and various internal functional modules of the electronic device. The frame body 10 may be made of a metal material such as aluminum, aluminum alloy, or steel. A specific material of the frame body 10 is not limited in embodiments of this application. The display may be disposed on the frame body 10 to implement a display function of the electronic device. In actual application, the display control line 11 may be disposed on the side, close to the frame body 10, of the display, and the display control line 11 may be configured to control display content of the display. Electrical conductivity of the display control line 11 is usually far lower than that of conventional metal, and has small impact on passage of magnetic lines. In other words, the display control line 11 allows passage of magnetic lines, to implement near field communication induction.

It should be noted that, in actual application, the display control line 11 may be disposed in an entire display area of the display. In the accompanying drawings of embodiments of this application, only a top position of the display control line 11 is simply shown.

As shown in FIG. 1, the antenna resonant arm 12 may be disposed on a top of the frame body 10, and the first antenna and the second antenna may be integrated into the antenna resonant arm 12. The first antenna may be configured to receive or radiate radio frequency signals, to implement a function of radio frequency communication, and the second antenna may be configured to induce magnetic lines, to implement a function of near field communication induction. That is, the first antenna may be a radio frequency antenna, the second antenna may be a near field communication antenna, and the two antennas have different operating frequency bands. The gap S may be formed between the antenna resonant arm 12 and the display control line 11, and the gap S can be used for passage of magnetic lines, to implement near field communication induction.

In embodiments of this application, because the clearance area 13 is provided at the position, close to the gap S, on the frame body 10, and the clearance area 13 can be used for passage of magnetic lines, an area for passage of the magnetic lines can be increased to achieve an objective of increasing an induction area for a near field communication module.

Specifically, the clearance area 13 may be obtained by hollowing out a dashed-line part of the frame body 10 to form a through groove. Because in the clearance area 13, a metal part of the frame body 10 is removed, a non-metal area can be formed to facilitate passage of magnetic lines. Because the electrical conductivity of the display control line 11 is usually far lower than that of conventional metal, and has small impact on passage of magnetic lines, the display control line 11 above the clearance area 13 allows passage of magnetic lines. In this way, external magnetic lines can not only pass through the gap S, but also pass through the clearance area 13 and the display control line 11 above the clearance area 13, to be sensed by the second antenna. Areas of the clearance area 13 and the gap S jointly form an induction area for the near field communication module.

In embodiments of this application, the antenna coupling structure 15 may be further disposed in the clearance area 13, and the antenna coupling structure 15 may be coupled to the antenna reference ground 14 to form a high-frequency return current path, increase coupling paths, and prevent the performance of the first antenna from being degraded. This can increase the induction area for the near field communication module without degrading the performance of the first antenna in a case that the first antenna and the second antenna are integrally disposed.

As shown in FIG. 2, the antenna coupling structure 15 may include a flexible printed circuit board 151 and a plurality of scattered coupling portions 152 sequentially disposed on the flexible printed circuit board 151, and at least one of the coupling portions 152 is coupled to the antenna reference ground 14 on the frame body 10.

In actual application, the flexible printed circuit board 151 may be connected to the frame body 10 through bonding, to implement a fixed connection of the antenna coupling structure 15 in the clearance area 13.

In this embodiment of this application, the flexible printed circuit board 151 may be added to the clearance area 13, and the flexible printed circuit board 151 may be coupled to a corresponding part of the frame body 10. The plurality of scattered coupling portions 152 may be disposed on the flexible printed circuit board 151 according to an actual requirement, and the coupling portions 152 may be scatteredly disposed inside the clearance area 13 or in areas outside the clearance area 13 according to a requirement. In actual application, at least one of the coupling portions 152 on the flexible printed circuit board 151 may be coupled to the antenna reference ground 14 to form a high-frequency return current path, increase coupling paths, and prevent the performance of the first antenna from being degraded.

As shown in FIG. 2, the plurality of coupling portions 152 are electrically connected to each other through the flexible printed circuit board 151. Specifically, the plurality of coupling portions 152 may be disposed in areas that need to be coupled to the antenna reference ground 14 according to an actual requirement. Adjacent coupling portions 152 may be electrically connected to each other through the flexible printed circuit board 151. Specifically, a width of a copper wire of the flexible printed circuit board 151 connected to the coupling portion 152 may be measured in millimeters.

It should be noted that, FIG. 2 shows only a case that the antenna coupling structure 15 includes five coupling portions 152, three of the five coupling portions 152 are located on a side, away from the gap S, of the clearance area 13, and the other two are respectively located at side edges of the clearance area 13. In actual application, a person skilled in the art can set a quantity of coupling portions 152 according to an actual requirement. For example, the quantity of coupling portions 152 may be 6, 8, 11, or the like, and specific positions of the coupling portions 152 may also be determined based on an actual situation. The specific quantity and positions of coupling portions 152 are not limited in embodiments of this application.

Optionally, the flexible printed circuit board 151 is disposed in the clearance area 13, an orthographic projection of at least a part of the coupling portion 152 on the frame body 10 overlaps the frame body 10, and a part of the coupling portion 152 overlapping the frame body 10 is coupled to the frame body 10. In other words, in the electronic device shown in FIG. 2, the flexible printed circuit board 151 and the coupling portion 152 are not directly electrically connected to the antenna reference ground 14, and a direct current cannot pass.

In actual application, an appropriate physical size may be designed for the antenna resonant arm 12. For example, a length of the antenna resonant arm 12 may be greater than 35 millimeters or the like, so that the second antenna has a specific length. The flexible printed circuit board 151 may be disposed in the clearance area 13. A plurality of coupling portions 152 may be scatteredly disposed on the flexible printed circuit board 151, and a first coupling capacitor may be disposed on the coupling portion 152. The first coupling capacitor is generally at a pF level to meet a design requirement of the first antenna. Because the first coupling capacitor has a high-pass characteristic, a capacitance value of the first coupling capacitor may be adjusted based on a designed frequency of the first antenna. Generally, a lower designed frequency of the first antenna indicates a larger capacitance value of the first coupling capacitor, and a higher designed frequency of the first antenna indicates a smaller capacitance value of the first coupling capacitor. Through setting of the capacitance value of the first coupling capacitor, an area for passage of magnetic lines can be expanded to a area of the display control line 11 without affecting the performance of the first antenna.

Optionally, capacitance of the first coupling capacitor is determined according to the following formula:

$$C=\xi r*S/(4*\pi*K*d) \quad \text{(Formula 1)}$$

C indicates the capacitance of the first coupling capacitor, ξr indicates a dielectric constant of a medium between the frame body 10 and the coupling portion 152, S indicates a coupling area of the coupling portion 152, K indicates an electrostatic constant, and d indicates a distance between the coupling portion 152 and the antenna reference ground 14.

It should be noted that, in actual application, each of the plurality of coupling portions 152 may be provided with one corresponding first coupling capacitor, and capacitance values of first coupling capacitors on different coupling portions 152 may be the same or different. The capacitance values of the first coupling capacitors on the coupling portions 152 are not specifically limited in embodiments of this application.

In this embodiment of this application, in the electronic device, metal of a terminal body may be used to form the antenna resonant arm 12, and the second antenna and the first antenna may be integrated into the antenna resonant arm 12. The clearance area 13 is provided on the frame body 10, and the antenna coupling structure 15 is disposed in the clearance area 13, so as to increase an induction area for the second antenna. In addition, as the induction area for the second antenna increases, a size of the second antenna can be reduced, to achieve an objective of reducing a size of the antenna resonant arm 12, and facilitate arrangement of other antennas in the electronic device. For example, with the use of the technical solutions of this application, the size of the antenna resonant arm 12 can be reduced from 40 millimeters to 30 millimeters.

Figure 3:
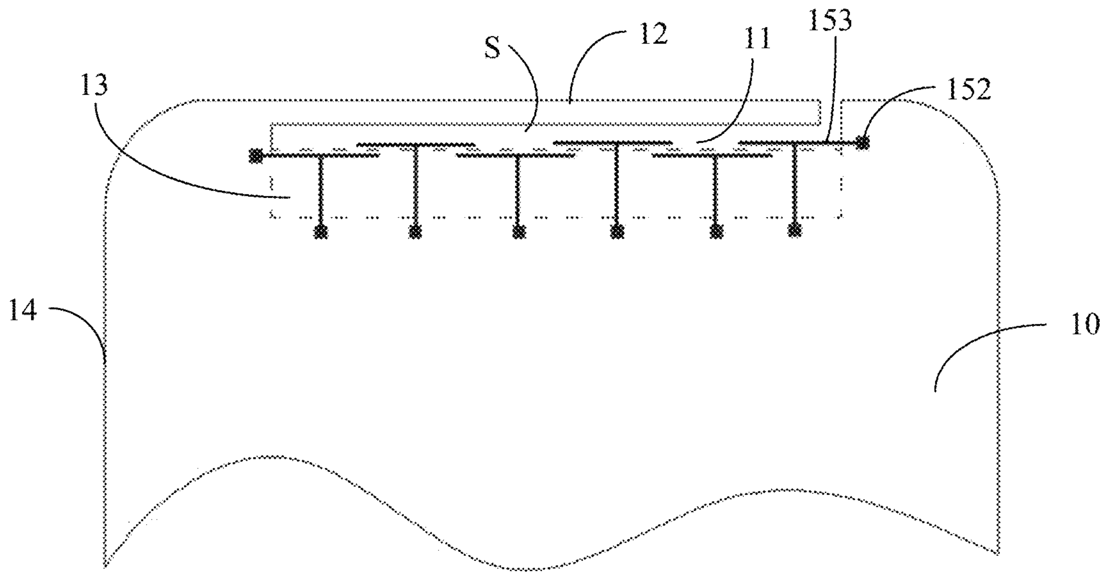
FIG. 3 is a schematic diagram of another internal structure of an electronic device according to an embodiment of this application.

FIG. 3 is a schematic diagram of another internal structure of an electronic device according to an embodiment of this application. As shown in FIG. 3, a plurality of branch structures 153 are sequentially disposed on the flexible printed circuit board 151, at least one coupling portion 152 is disposed on each branch structure 153, and the coupling portion 152 is coupled to the antenna reference ground 14 on the frame body 10. Two adjacent branch structures 153 are high-frequency coupled to each other.

Specifically, the branch structures 153 may be T-shaped branches, and two adjacent branch structures 153 may be high-frequency coupled to each other, so that the plurality of branch structures 153 are an open circuit for a near field communication signal and a short circuit for a high frequency of a co-radiator. In this way, the antenna coupling structure 15 formed by the plurality of branch structures 153 can form a high-frequency return current path, increase coupling paths, and prevent the performance of the first antenna from being degraded.

In an optional embodiment of this application, the antenna coupling structure 15 may include a flexible printed circuit board 151 and a plurality of scattered coupling portions 152 sequentially disposed on the flexible printed circuit board 151, and the coupling portion 152 is coupled to the frame body 10. In specific application, in a case that the coupling portion 152 is coupled to the frame body 10, a third coupling capacitor may be disposed on the coupling portion 152. Specifically, a capacitance value of the third coupling capacitor may be determined based on capacitance on the flexible printed circuit board 151 and the frame body 10 and capacitance between the flexible printed circuit board 151 and the frame body 10. The capacitance value of the third coupling capacitor is not specifically limited in embodiments of this application.

Figure 4:
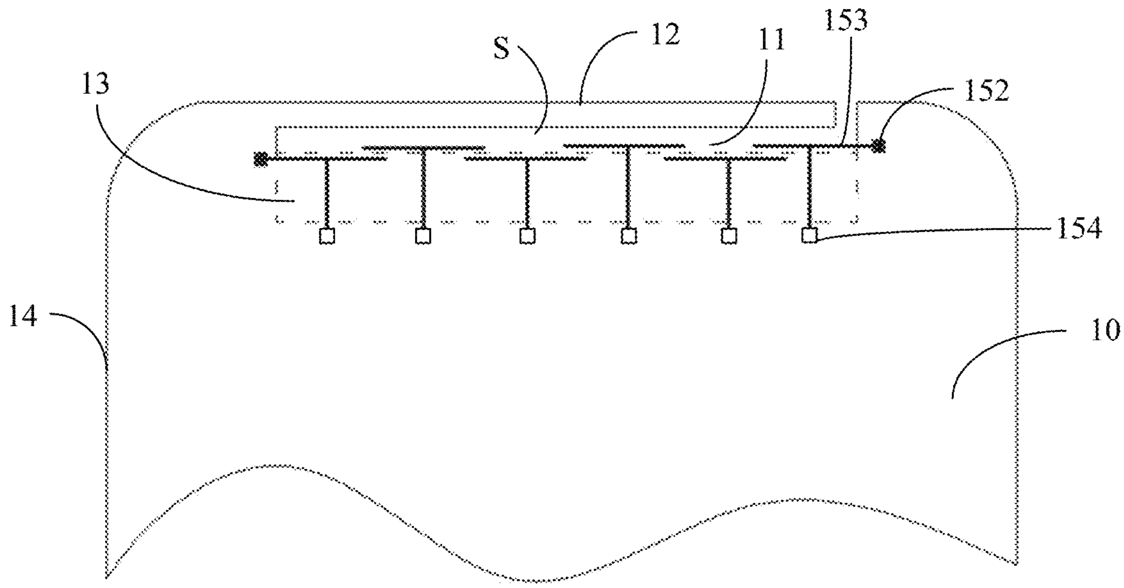
FIG. 4 is a schematic diagram of still another internal structure of an electronic device according to an embodiment of this application.

FIG. 4 is a schematic diagram of still another internal structure of an electronic device according to an embodiment of this application. As shown in FIG. 4, a plurality of branch structures 153 are sequentially arranged on the flexible printed circuit board 151 at intervals, one coupling portion 152 is disposed on the branch structure 153 located at an edge, and the coupling portion 152 is coupled to the antenna reference ground 14 on the frame body 10. Electrical connection portions 154 are further disposed on the branch structures 153, and the electrical connection portions 154 are electrically connected to the antenna reference ground 14 on the frame body 10. Two adjacent branch structures 153 are high-frequency coupled to each other.

As shown in FIG. 4, the coupling portion 152 on the branch structure 153 located at the edge may be coupled to the antenna reference ground 14 on the frame body 10. The electrical connection portions 154 on the branch structures 153 located at edges and/or intermediate positions may be electrically connected to the antenna reference ground 14 on the frame body 10. A plurality of second coupling capacitors are disposed between two adjacent branch structures 153, and the second coupling capacitors are coupled to the branch structures 153.

In actual application, in a case that the electrical connection portions 154 on the branch structures 153 are electrically connected to the frame body 10, the branch structures 153 and the frame body 10 are connected in a direct current manner. In this case, the second coupling capacitors may be disposed between two adjacent branch structures 153, and a coupling amount of the second coupling capacitors may be implemented by setting capacitance distributed on the flexible printed circuit board 151 between the two adjacent branch structures 153, or may be implemented by connecting a capacitor or a series combination of a capacitor and an inductor to coupled branches.

In this embodiment of this application, the plurality of branch structures 153 are disposed in the antenna coupling structure 15, so that coupling capacitors can be disposed by using a manufacturing process of the flexible printed circuit board 151, thereby enhancing control of precision of the coupling capacitors of the antenna coupling structure 15. Because process tolerance of the flexible printed circuit board 151 may be within 0.1 millimeter, disposing the coupling capacitors on the flexible printed circuit board 151 can greatly enhance control of precision of the coupling capacitors.

In this embodiment of this application, the electronic device may further include a radio frequency signal source and a near field communication module. One end of the antenna resonant arm 12 is electrically connected to the near field communication module and/or the radio frequency signal source, and the other end of the antenna resonant arm 12 is connected to the antenna reference ground 14, so that the antenna resonant arm 12 can integrate functions of the first antenna and the second antenna.

In conclusion, the electronic device described in embodiments of this application includes at least the following advantages.

In embodiments of this application, because the clearance area is provided at the position, close to the gap, on the frame body, and the clearance area can be used for passage of magnetic lines, an area for passage of the magnetic lines can be increased to achieve an objective of increasing an induction area for the near field communication module. In addition, because the antenna coupling structure is disposed in the clearance area, the antenna coupling structure may be coupled to the antenna reference ground to form a high-frequency return current path, increase coupling paths, and prevent performance of the first antenna from being degraded. This can extend the area for passage of the magnetic lines without degrading the performance of the first antenna, and therefore increase the induction area for the near field communication module without degrading the performance of the first antenna in a case that the first antenna and the second antenna are integrally disposed.

In the descriptions of this specification, the description with reference to the terms such as "an embodiment", "some embodiments", "an illustrative embodiment", "an example", "a specific example", or "some examples" means that a specific feature, a structure, a material, or a characteristic described with reference to the embodiment or example is included in at least one embodiment or example of this application. In this specification, the foregoing example expressions of the terms are not necessarily with respect to a same embodiment or example. In addition, the described specific features, structures, materials, or characteristics may be combined in a proper manner in any one or more of embodiments or examples.

Although embodiments of this application have been illustrated and described, a person of ordinary skill in the art can understand that various changes, modifications, replacements, and variants may be made to these embodiments without departing from the principle and purpose of this application, and the scope of this application is limited by the claims and their equivalents.

What is claimed is:

1. An electronic device, comprising: a frame body, a display, and an antenna coupling structure, wherein the display is disposed on the frame body, and a display control line is disposed on a side, close to the frame body, of the display;

an antenna resonant arm is disposed on the frame body, the antenna resonant arm serves as a first antenna and a second antenna, wherein the first antenna and the second antenna having different operating frequency bands, and a gap is formed between the antenna resonant arm and the display control line; and a clearance area is provided at a position, close to the gap, on the frame body, the antenna coupling structure is disposed in the clearance area, and the antenna coupling structure is coupled to an antenna reference ground on the frame body; wherein the antenna coupling structure comprises a flexible printed circuit board and a plurality of scattered coupling portions sequentially disposed on the flexible printed circuit board, and at least one of the coupling portions is coupled to the antenna reference ground on the frame body;

wherein a plurality of branch structures are arranged on the flexible printed circuit board at intervals, at least one coupling portion is disposed on each branch structure, and the coupling portion is coupled to the antenna reference ground on the frame body; and two adjacent branch structures are high-frequency coupled to each other;

or, wherein a plurality of branch structures are sequentially arranged on the flexible printed circuit board at intervals, one coupling portion is disposed on the branch structure located at an edge, and the coupling portion is coupled to the antenna reference ground on the frame body;

electrical connection portions are further disposed on the branch structures, and the electrical connection portions are electrically connected to the antenna reference ground on the frame body; and two adjacent branch structures are high-frequency coupled to each other.

2. The electronic device according to claim 1, wherein the plurality of coupling portions are electrically connected to each other through the flexible printed circuit board.

3. The electronic device according to claim 2, wherein the flexible printed circuit board is disposed in the clearance area, an orthographic projection of at least a part of the coupling portion on the frame body overlaps the frame body, and a part of the coupling portion overlapping the frame body is coupled to the antenna reference ground on the frame body.

4. The electronic device according to claim 3, wherein a first coupling capacitor is disposed on the coupling portion.

5. The electronic device according to claim 4, wherein capacitance of the first coupling capacitor is determined according to the following formula:

$$C = \xi r * S/(4 * \pi * K * d),$$

wherein

C indicates the capacitance of the first coupling capacitor, ξ r indicates a dielectric constant of a medium between the frame body and the coupling portion, S indicates a coupling area of the coupling portion, K indicates an electrostatic constant, and d indicates a distance between the coupling portion and the antenna reference ground.

6. The electronic device according to claim 4, wherein each of the coupling portions is capable of being provided with one corresponding first coupling capacitor, and capacitance values of first coupling capacitors on different coupling portions are the same.

7. The electronic device according to claim 4, wherein each of the coupling portions is capable of being provided with one corresponding first coupling capacitor, and capacitance values of first coupling capacitors on different coupling portions are different.

8. The electronic device according to claim 1, wherein the flexible printed circuit board is bonded to the frame body.

9. The electronic device according to claim 1, wherein the antenna coupling structure comprises a flexible printed circuit board and a plurality of scattered coupling portions sequentially disposed on the flexible printed circuit board, and the coupling portion is coupled to the frame body.

10. The electronic device according to claim 1, further comprising: a radio frequency signal source and a near field communication module, wherein one end of the antenna resonant arm is electrically connected to the near field communication module, or the one end of the antenna resonant arm is electrically connected to the radio frequency signal source, or the one end of the antenna resonant arm is electrically connected to the near field communication module and the radio frequency signal source, and the other end of the antenna resonant arm is connected to the antenna reference ground.

11. The electronic device according to claim 1, wherein the first antenna comprises a radio frequency antenna, and the second antenna comprises a near field communication antenna.

* * * * *